US009990190B1

United States Patent
Burriss et al.

(10) Patent No.: US 9,990,190 B1
(45) Date of Patent: Jun. 5, 2018

(54) SECURED VIRTUAL STORAGE APPLIANCE INSTALLATION IMAGE

(71) Applicant: EMC IP Holding Company LLC, Hopkinton, MA (US)

(72) Inventors: Michael L. Burriss, Raleigh, NC (US); Weixing Wang, Durham, NC (US); Benjamin P. Kelley, Worcester, MA (US); Gregory W. Lazar, Upton, MA (US); Jochen F. De Smet, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 31 days.

(21) Appl. No.: 15/142,788

(22) Filed: Apr. 29, 2016

(51) Int. Cl.
*G06F 9/445* (2018.01)
*H04L 29/08* (2006.01)
*H04L 29/06* (2006.01)

(52) U.S. Cl.
CPC ............ *G06F 8/63* (2013.01); *H04L 63/0428* (2013.01); *H04L 67/34* (2013.01)

(58) Field of Classification Search
None
See application file for complete search history.

(56) References Cited

U.S. PATENT DOCUMENTS

| 2002/0099666 | A1* | 7/2002 | Dryer | G06F 21/55 705/71 |
| 2014/0068258 | A1* | 3/2014 | Chao | G06F 11/1469 713/167 |
| 2015/0074409 | A1* | 3/2015 | Reid | H04L 63/061 713/171 |

* cited by examiner

Primary Examiner — Qamrun Nahar
(74) Attorney, Agent, or Firm — BainwoodHuang (57) ABSTRACT

An installation image of a virtual storage appliance (VSA) is protected by initiating VSA installation from an archive image establishing a pre-installation operating state. The archive image includes an installation image with a lockbox storing a first key for accessing the installation image. The lockbox is encrypted using a second key derived from a stable system value (SSV), such as data for device partitioning, obtainable from an execution environment in the pre-installation operating state. During installation, the SSV is obtained and used in decrypting the lockbox to retrieve the first key and use the installation image to install the VSA. The VSA is installed in a manner establishing a post-installation operating in which the SSV is no longer obtainable from the execution environment, e.g., due to changing the device partition information. An SSV obtained from the partition information post-installation does not yield the key for decrypting the lockbox, protecting the installed image.

20 Claims, 6 Drawing Sheets

SECURED VIRTUAL STORAGE APPLIANCE INSTALLATION IMAGE

BACKGROUND

The present invention is related to the field of virtual computing, i.e., systems employing virtualization technology to deploy applications on software-defined "machines" referred to as "virtual machines". In particular, the invention relates to specialized virtual machines providing data storage, referred to herein as "virtual storage appliances" or VSAs.

SUMMARY

A virtual storage appliance or VSA is a software-implemented component executed in a virtualized environment to provide virtualized data storage resources to other system elements, such as other VMs executing application software for example. From the perspective of the rest of the system, a VSA resembles its purpose-built, dedicated-hardware counterpart, such as a network attached storage (NAS) box or an integrated cached disk array (ICDA). The VSA relies on a virtualizer such as a hypervisor to support both the required interfaces (e.g., storage-oriented network interfaces and device interfaces) and virtual "raw" storage (supported by underlying real physical storage devices) on which the VSA builds more complex and feature-rich storage objects for presentation to the rest of the system.

VSA software is distributed as an archive image, for example the known Open Virtual Archive or OVA format. One of the issues with OVAs and other archives used for VM distribution is that they can be relatively easy to open and manipulate, which can increase the risk of unauthorized copying of sensitive/confidential information such as trade secrets and other intellectual property. This can create risk for related purpose-built products using the same code as used in an OVA release. An additional risk is a bad actor spoofing a VSA, i.e., creating a VSA that looks authentic but in fact contains malware such as a keylogger or connection backdoor.

The present disclosure is directed to protecting a VSA installation image, in particular the critical intellectual, cryptographic and operational secrets it contains. Generally the disclosed technique maintains the VSA image in either of two states, and the transition from one state to the other creates a strong lock on the secrets within the image that could be used to decrypt and access sensitive information. A first state is a "Pre-install" state that exists only upon deployment and the initial part of the first boot. A process is used to create a modified image having a distinct "Runtime" state. Sensitive contents are encrypted into a security structure known as a "lockbox" within the image, and the keys for the lockbox include one or more so-called "stable system values" or SSVs relating to the system state. The lockbox can only be opened when the system is in the Pre-install state and the associated SSVs match the lockbox key. Once the system state changes to Runtime, its SSVs necessarily change to other values that do not match those needed for the lockbox so the lockbox cannot be opened and its contents are not available to decrypt the VSA image for unauthorized access.

More particularly, a method is disclosed of securing an installation image of a virtual storage appliance to be installed on a host computer. The method includes initiating installation of the virtual storage appliance from an archive image stored on the host computer and establishing a pre-installation operating state. The archive image includes the installation image with a lockbox storing a first key for accessing the installation image. The lockbox is encrypted using a second key derived from a stable system value obtainable from an execution environment of the host computer only in the pre-installation operating state. In one example, the relevant state includes the partitioning of the system device. The method further includes obtaining the stable system value from the execution environment and using it in decrypting the lockbox to retrieve the first key and access the installation image of the virtual storage appliance included in the archive image, and then using the accessed installation image to install the virtual storage appliance on the host computer. The virtual storage appliance is installed in a manner establishing a post-installation operating state exclusive of the pre-installation operating state and in which the stable system value is no longer obtainable from the execution environment of the host. In the example using partitioning information, the installation changes the partitioning for the system device. Thus, a stable system value obtained from the partition information post-installation does not yield the key for decrypting the lockbox, so the key for decrypting the installed image is not accessible.

The disclosed technique addresses the potential issues related to archive distribution of VSA software. By protecting the installation image, it decreases the risk of a bad actor causing harm in purpose-built products or spoofing a VSA and infecting a system with malware.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
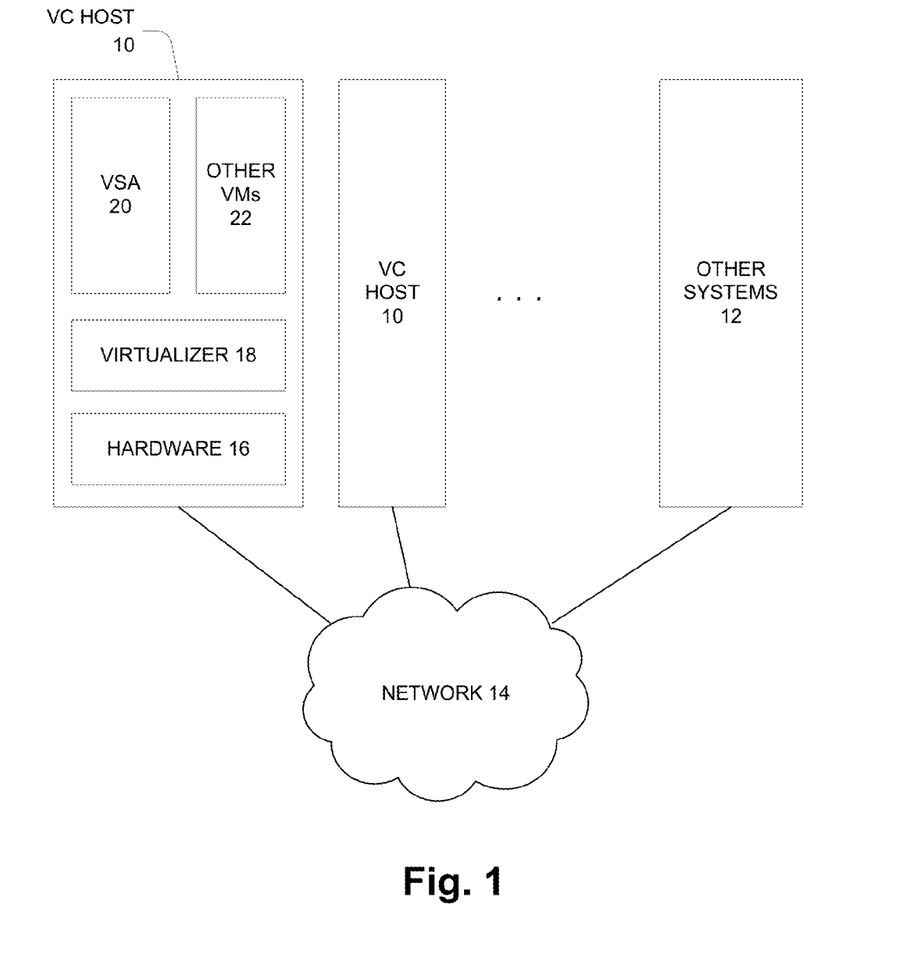
FIG. 1 is a block diagram of a computer system.

FIG. 1 shows a computing system including specialized host computers shown as virtual computing (VC) hosts 10 and other systems 12 interconnected by a network 14. As shown, a VC host 10 includes hardware 16 such as processors, memory, interface circuitry etc. as generally known, and software-implemented components including a virtualizer 18 and virtual machines (VMs) shown as a virtual storage appliance (VSA) 20 and other VMs 22. The other VMs 22 may include additional VSAs 20, and/or VMs configured for other dedicated or general purposes, such as network appliances, specialized application servers such as database servers, etc. The other systems 12, when present, may include specialized components such as data storage systems, network devices, application-specific components for supporting specific deployments, etc.

The virtualizer 18 of the VC host 10 provides an operating environment presenting abstracted or "virtual" resources to the VMs 20, 22 using real resources of the hardware 16 and other physical system components, such as the network 14 and other systems 12. In one class of VC host 10, the virtualizer 18 is realized using a hypervisor, which is generally understood as interfacing directly with the hardware 16 without intermediation by a separate host operating system. Other classes of VC hosts 10 employ other configurations.

The VSA 20 is a software-implemented data storage appliance, analogous to conventional standalone hardware storage appliances such as network attached storage (NAS) boxes, integrated cached disk arrays (ICDAs), etc. In one type of embodiment, the VSA 20 is implemented using a software image also usable to realize such dedicated hardware storage appliances, which is referred to herein as the "dedicated" or "purpose-built" environment in contrast to the "virtual" or "general-purpose" environment that is the primary subject of this description. The VSA 20 uses underlying raw storage resources to present value-added storage to applications executing in the system. Value-added services can cover a broad range including RAID, data deduplication, compression, clustering and failover, etc. Thus the VSA 20 is a consumer of lower-level storage resources such as plain virtual disks, and a provider of higher-level storage resources to applications executing in the system.

Physical data storage needs of the system are generally provided by some combination of so-called "direct attached" storage at the VC hosts 10 and network-accessed storage such as purpose-built storage appliances (NAS, ICDAs, etc.) that may be included in other systems 12. In particular, the virtualizer 18 is responsible for understanding the physical storage resources available in the system and using the storage resources to provide virtual storage to the VSA 20.

Figure 2:
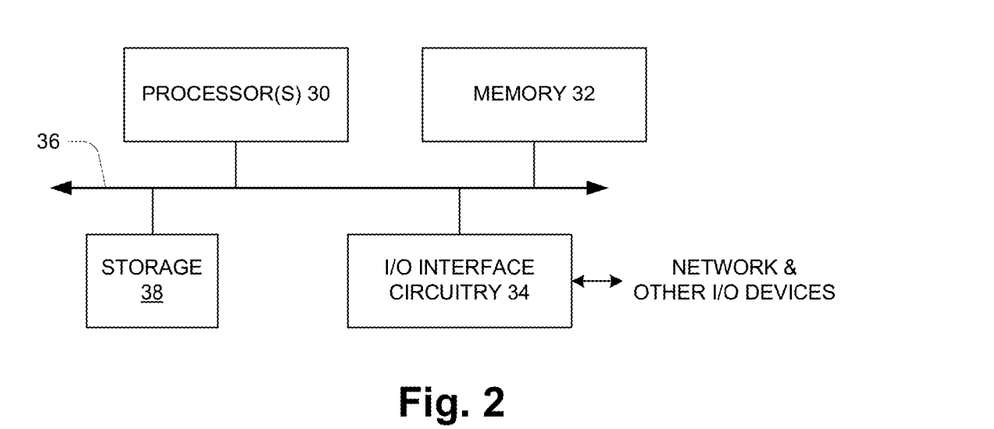
FIG. 2 is a hardware-oriented block diagram of a computer.

FIG. 2 shows an example configuration of a VC host 10 from a computer hardware perspective. The hardware includes one or more processors 30, memory 32, and interface circuitry 34 interconnected by data interconnections 36 such as one or more high-speed data buses. The interface circuitry 34 provides a hardware connection to the network 12 (FIG. 1) and perhaps other external devices/connections (EXT DEVs). The processor(s) 30 with connected memory 32 may also be referred to as "processing circuitry" herein. As mentioned, there may also be local or direct-attached storage 38 such as local-attached disk drives or Flash drives. In operation, the memory 32 stores data and instructions of system software (e.g., operating system, hypervisor, etc.) and one or more application programs which are executed by the processor(s) 30 to cause the hardware to function in a software-defined manner.

Figure 3:
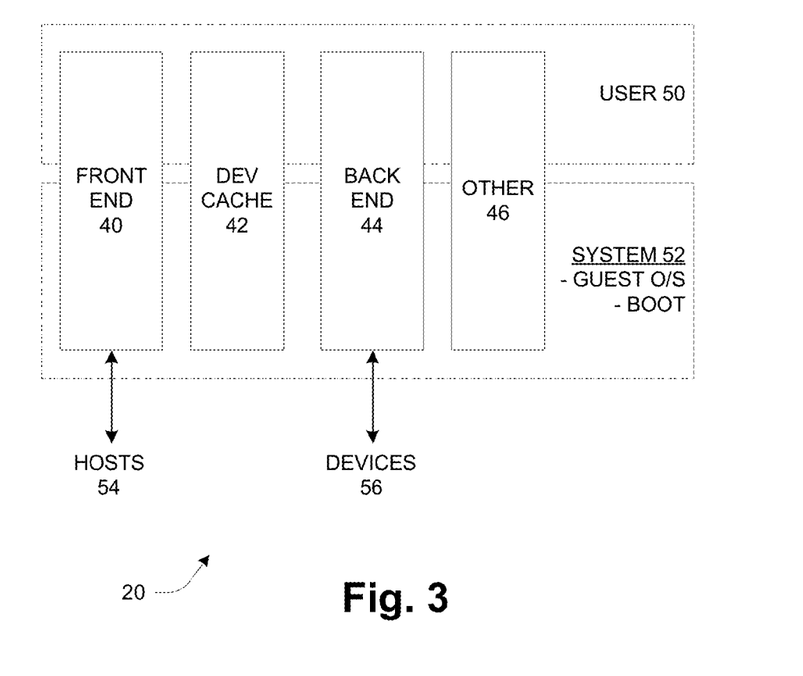
FIG. 3 is a schematic describing organization of a virtual storage appliance (VSA)

FIG. 3 shows a configuration of a VSA 20. It includes a variety of software-implemented components shown as a front end 40, device cache 42, back end 44, and other 46. These components collectively provide the above-described value-added storage functionality of the VSA 20. Each component has sub-components or modules divided between user space 48 and system space 50, which refers to a local operating environment provided by a guest operating system (O/S) for example. System space 50 also includes bootstrap or "boot" modules, for which certain functionality is described below.

Generally, the front end 40 provides functionality for desired interface(s) to the hosts 54, for example supporting a block-based communications protocol such as iSCSI or a NAS protocol such as CIFS. It may also implement virtual-storage oriented protocols. The front end 40 uses internal mechanisms to realize the underlying functionality. One of the internal mechanisms may be the device cache 42, which caches data of underlying storage devices accessed via the back end 44 to make the data more quickly available, increasing performance. The back end 44 interfaces to the storage resources, such as virtual disks, provided by the virtualizer 18. These storage resources are shown as "devices" 56 in FIG. 3. The other components 46 include things like management and service components, general O/S components or libraries, and utilities.

Figure 4:
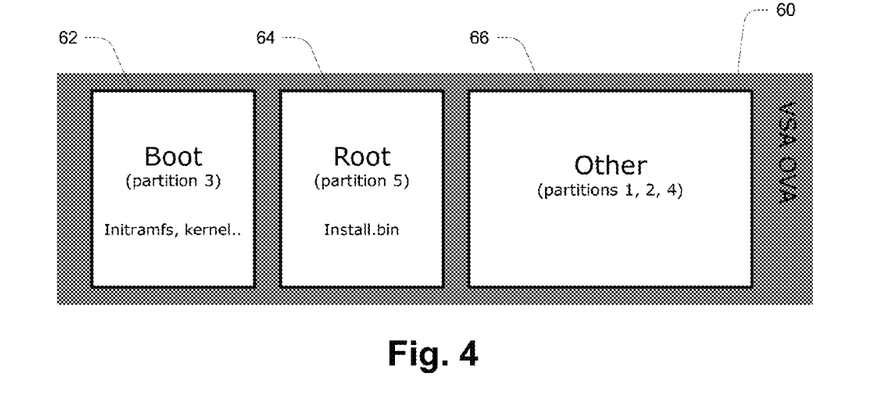
FIGS. 4 and 5 are schematic diagrams of system images.

FIG. 4 is a schematic illustration of a binary image or "image" 60 of the software for a VSA 20. The image is a unitary data item, such as a file, that can be downloaded, moved, copied etc. just like other files. It includes all the required software components for a VSA 20 along with certain structuring and metadata. In one embodiment the image 60 complies with a known archive format, such as Open Virtual Archive (OVA) which is widely used to distribute complete system images for installation and execution on virtual machines. The OVA is essentially a disk image, i.e., an image of the system as it will be stored on a system device, along with metadata. In the illustrated arrangement, the image 60 has components intended for installation on different partitions of a system device as follows:

Boot 62—partition 3
    Root 64—partition 5
    Other 66—partitions 1, 2 and 4

As shown, the root 64 includes a compressed binary image of the operating system (O/S) identified as "install.bin".

One of the issues with OVAs and other archives used for VM distribution is that they can be relatively easy to open and manipulate, which can increase the risk of unauthorized copying of sensitive/confidential information such as encryption keys, trade secrets, and other intellectual property. This can lead to the kinds of risks discussed above, e.g., risk to related purpose-built products and VSA spoofing.

Therefore, the present disclosure is generally directed to protecting an OVA installation image such as image 60 to protect the critical intellectual, cryptographic and operational secrets it contains. The description below focuses primarily on one aspect of protection, which is protection against unauthorized access to the sensitive data therein, which may occur in an offline manner by using tools to access the file contents. Another important aspect is protection during runtime, i.e., protection from unauthorized modification (tampering) of an installed image that could create security or other operational issues in a system. For this latter aspect of tampering, there are known features of operating systems, including for example encryption technology, for protecting critical components contained within the image 60 and on the system during runtime. As mentioned, the remaining description focuses on a technique for the first type of protection, i.e., unauthorized access.

Generally the disclosed technique maintains the VSA image in either of two states, and the transition from one state to the other creates a strong lock on the secrets within the image that could be used to decrypt and access sensitive information. A first state is a "Pre-install" state that exists only upon deployment and the initial part of the first boot. A process is used to create a modified image having a distinct "Runtime" state. Sensitive contents are encrypted into a security structure known as a "lockbox" within the image, and the keys for the lockbox include one or more so-called "stable system values" or SSVs relating to the system state. The lockbox can essentially only be opened once, when the system is in the Pre-install state and the associated SSVs match those for the lockbox so that it can be opened (decrypted). Once the system state changes to Runtime, its SSVs necessarily change to other values that do not match those needed for the lockbox, protecting the secrets therein including the encryption keys used to encrypt the sensitive portion of the image. Any attempted unauthorized access based on accessing those encryption keys will be unsuccessful.

Figure 5:
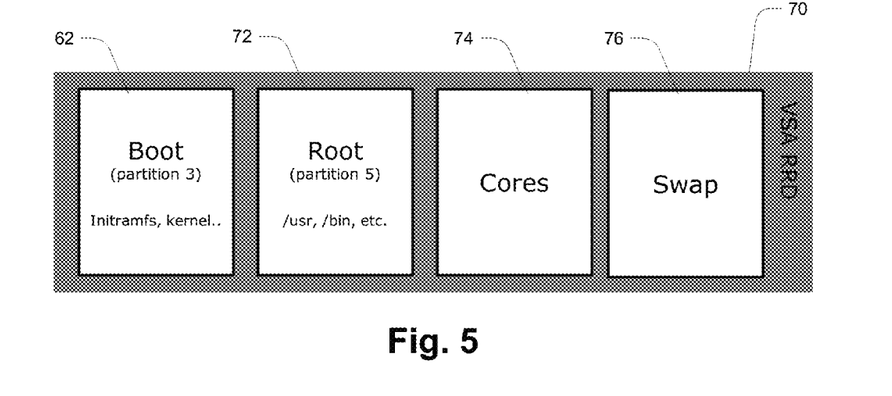

FIGS. 4 and 5 illustrate the general methodology that is utilized. The root 64 within the image 60 contains an installer disk image, in this instance identified as install.bin. The image 60 is written to a root runtime device (RRD) that is provided to the VSA 20 by the virtualizer 18 during creation of the virtual machine for the VSA 20. This initial writing of the image is part of a "deployment" operation carried out by the virtualizer 18 for the VSA 20. The image 60 includes a self-installer that, on first boot, performs an installation of the image 60 to a backend mirror device which is defined by the VSA's configuration for this purpose and is partitioned from storage provided by the virtualizer 18 to the VSA 20 when first deployed. This operation is essentially the installation of the a binary installation image to the backend mirror device. After the image 60 is installed to the backend mirror device, the RRD device is repartitioned and imaged from the backend mirror device, yielding the installed image 70 shown in FIG. 5, which has a structure different from that of image 60. The installation process modifies the structure of the system, specifically the partitioning of the system device, to create the Runtime state of the RRD after installation. The running, functional VSA does not have the same partitioning state as the pre-install state. Assuming that the SSVs pertain to either the partitioning or other system characteristics that necessarily change in the installation process, the SSVs at runtime do not match those required to open the lockbox, which are selected to match the SSVs at pre-install time.

Beyond the SSV related to the state of the system during installation, the lockbox may also contain another SSV that only this particular VSA would match. This may be a unique serial number or other instance identifier for example. Such a second SSV essentially keys the image the particular VSA environment.

Figure 6:
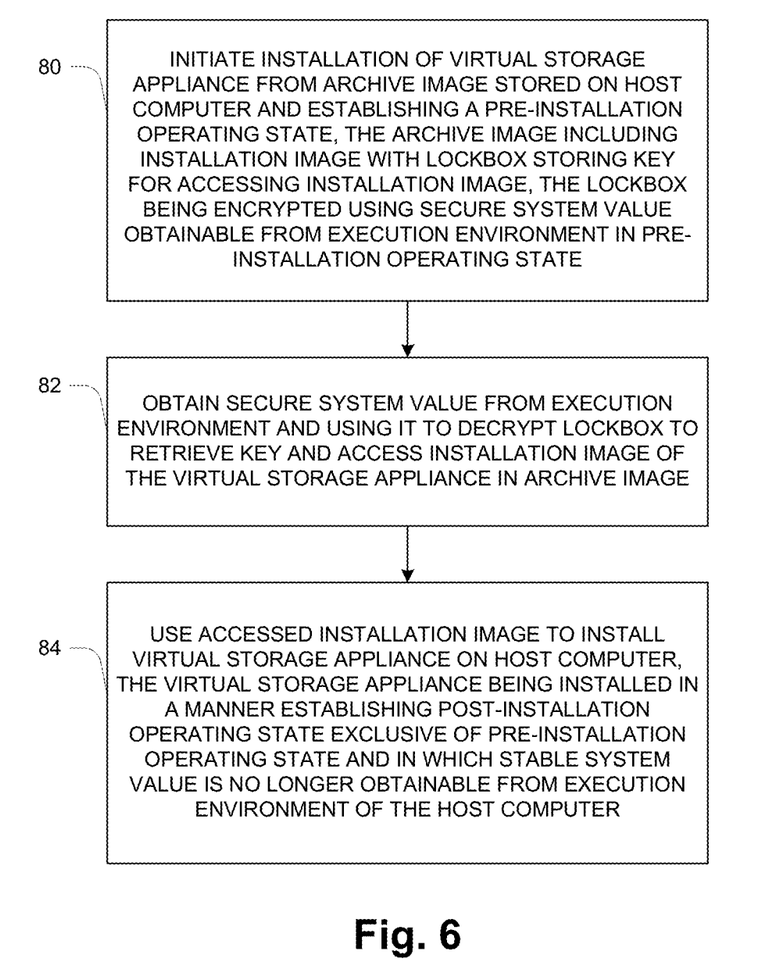
FIG. 6 is a flow diagram of installation.

FIG. 6 illustrates pertinent operation, i.e., a method of securing an installation image of a virtual storage appliance (VSA) to be installed on a host computer. This flow describes the method in general terms; a more specific process is described below.

At 80, installation of the virtual storage appliance is initiated from an archive image (e.g., image 60) stored on the host computer and establishing a pre-installation operating state. The archive image includes the installation image of the VSA with a lockbox storing a first key for accessing the installation image. The lockbox is encrypted using a second key derived from a stable system value obtainable from an execution environment of the host computer in the pre-installation operating state. As noted above, this SSV may pertain to the partitioning of the RRD for example. Partitioning information is obtainable from a system device partition table, as generally known in the art.

At 82, the stable system value is obtained from the execution environment and used in decrypting the lockbox to retrieve the first key and access the installation image of the virtual storage appliance included in the archive image. As noted, the key for decrypting the lockbox is derived from the SSV.

At 84, the accessed installation image is used to install the virtual storage appliance on the host computer, the virtual storage appliance being installed in a manner establishing a post-installation operating state exclusive of the pre-installation operating state and in which the stable system value is no longer obtainable from the execution environment of the host computer. As described above, this process may change the partitioning of the RRD device, for example, which necessarily alters a partition-related SSV so that it no longer matches the SSV needed to decrypt the lockbox. The lockbox can no longer be opened by usual means, so the encrypted portions of the installation image is protected from unauthorized access.

Figure 7:
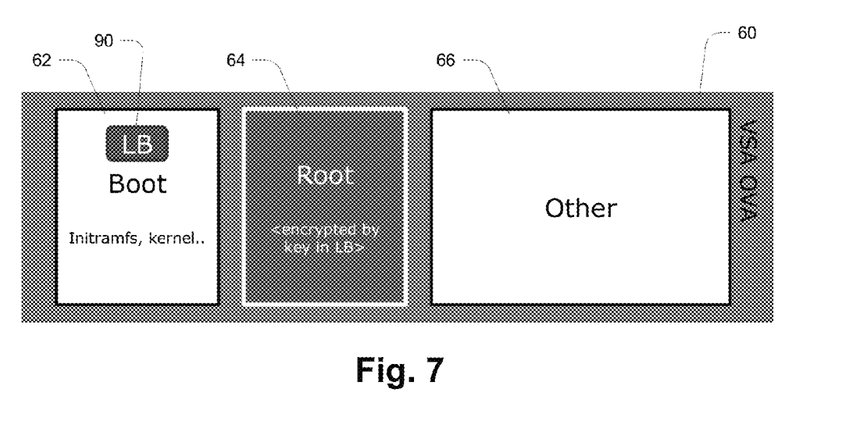
FIG. 7 is a schematic diagrams of a system image.
Figure 8:
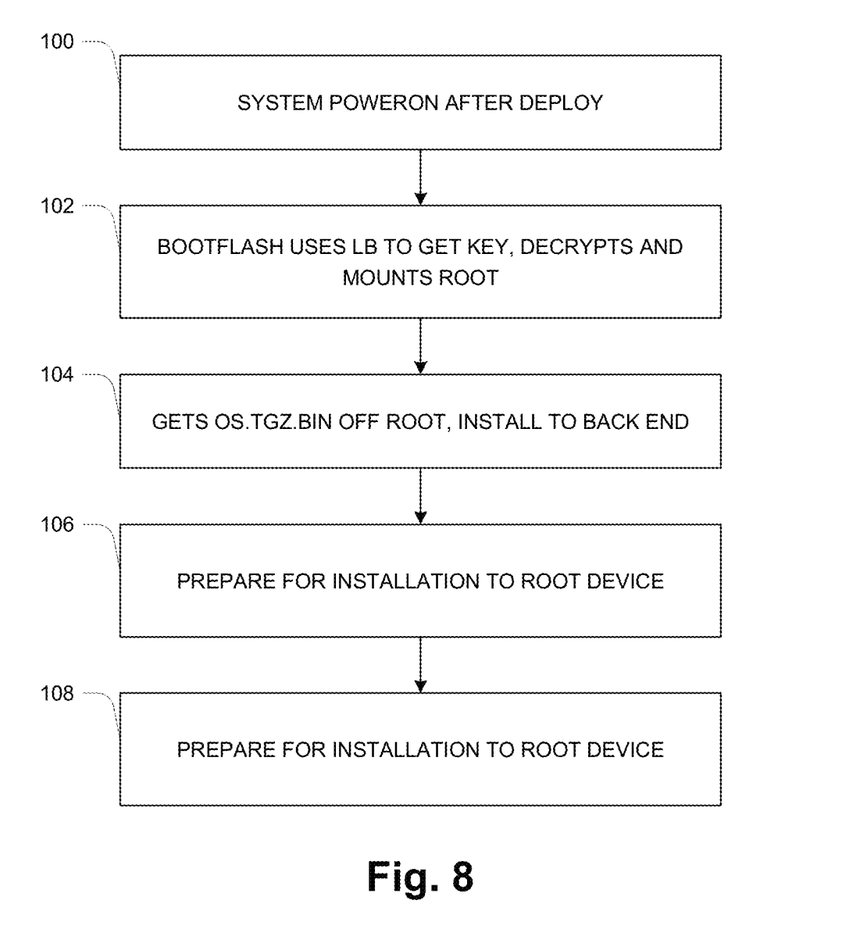
FIG. 8 is a flow diagram of installation.
Figure 9:
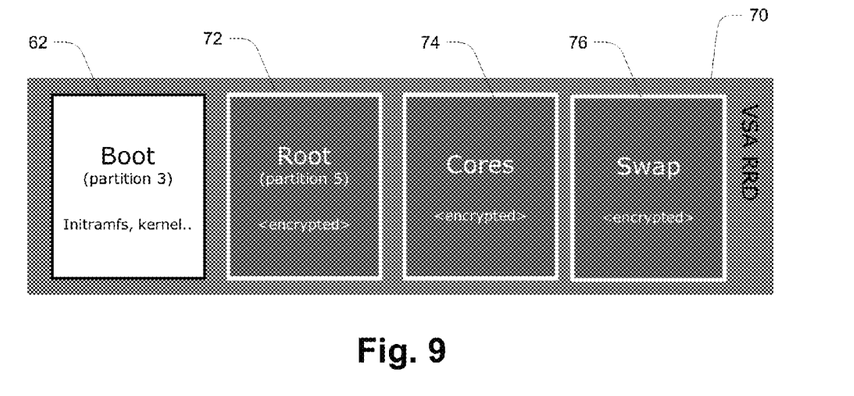
FIG. 9 is a schematic diagram of a system image.

FIGS. 7 and 8-9 show the pre-installation (OVA) image 60 and installed image 70 in additional detail. FIG. 7 shows the lockbox (LB) 90 stored in the boot partition 62 of the OVA 60 as it is initially built and distributed. It also illustrates that the root partition 64 is encrypted or "scrambled" by a key stored in the LB 90. As noted above, the lockbox 90 itself is encrypted by another key, referred to as a default key, that includes one or more stable system values (SSVs) related to the pre-installation state. As an example, the default key may include data describing the partition shown in FIG. 7. At installation time, the installer code computes an SSV from data in the system partition table, which at that time reflects the partitioning shown in FIG. 7, and this SSV will match that of the default key and thus enable the lockbox 90 to be decrypted. In particular, it allows retrieval of the key that encrypted the root partition 64, enabling its decryption and use.

FIG. 8 shows an installation process in one embodiment. At 100, there is a system poweron event initiated by the virtualizer 18 upon deployment. This initiates operation of the boot code from boot partition 62, in particular a self-installer therein. At 102, the self-installer uses the lockbox 90 to get the root encryption key, then decrypts and mounts the root partition. At 104, it accesses the installation binary from the root and installs it to the backend device. At 106, it prepares for installing the image from the backend device to the root device (RRD). This preparation includes creating a unique RRD key and re-encrypting the root 62 on the backend device, using standard SSVs different from the SSV(s) used for the lockbox key. The self-installer then images the backend device to the root device. At this point the system can be booted into normal operation from the image on the root device, and is in the "Runtime" state.

FIG. 9 shows the installed image 70 on the root device after the above process. The root partition 72 as well as the cores 74 and swap 76 partitions are encrypted by the new, unique key stored in the lockbox 90 (not shown in FIG. 9) in the boot partition 62. The lockbox 90 is still stored in the boot partition 62, but it can no longer be opened, because the SSVs of the system in the Runtime state do not match the lockbox key.

The above process protects the content of the OVA 60 and installed image 70 against unauthorized access. For example, it is not possible to clone the root device in a manner that would enable one to see the contents of the root 72. The root 72 is encrypted with the unique key stored in the lockbox 90, which cannot be opened outside of the runtime environment without knowing the proper SSVs. It is also not possible to use the default lockbox to decrypt the VSA OVA root partition. The lockbox can only be opened on the system during install time, assuming that the lockbox encryption key is specific to the pre-install state such as by use of partitioning information as described above.

The following specifics which have been mentioned may be modified, augmented, or replaced by alternatives as might be apparent to those skilled in the art based on this disclosure:

The SSV(s) pertain to partitions of storage devices such as an RRD which are defined in the installation image and modified by the installation. A specific example is some combination of the boot partition and root partition.

Installation involves a preliminary installation to backend device that this then imaged to a root device The lockbox contains a key encrypting sensitive parts of the installation image The runtime RRD is encrypted using separate mechanism of the guest O/S A second SSV may be used to key the image the VSA environment While various embodiments of the invention have been particularly shown and described, it will be understood by those skilled in the art that various changes in form and details may be made therein without departing from the spirit and scope of the invention as defined by the appended claims.

What is claimed is:

1. A method of securing an installation image of a virtual storage appliance to be installed on a host computer, comprising:

initiating installation of the virtual storage appliance from an archive image stored on the host computer and establishing a pre-installation operating state, the archive image including the installation image with a lockbox storing a first key for accessing the installation image, the lockbox being encrypted using a second key derived from a stable system value obtainable from an execution environment of the host computer in the pre-installation operating state;

obtaining the stable system value from the execution environment and using it in decrypting the lockbox to retrieve the first key and access the installation image of the virtual storage appliance included in the archive image; and using the accessed installation image to install the virtual storage appliance on the host computer, the virtual storage appliance being installed in a manner establishing a post-installation operating state exclusive of the pre-installation operating state and in which the stable system value is no longer obtainable from the execution environment of the host computer.

2. A non-transitory computer-readable medium storing computer program instructions, the instructions being executable by a host computer to cause the host computer to perform a method of securing an installation image of a virtual storage appliance to be installed on the host computer, the method comprising:

initiating installation of the virtual storage appliance from an archive image stored on the host computer and establishing a pre-installation operating state, the archive image including the installation image with a lockbox storing a first key for accessing the installation image, the lockbox being encrypted using a second key derived from a stable system value obtainable from an execution environment of the host computer in the pre-installation operating state;

obtaining the stable system value from the execution environment and using it in decrypting the lockbox to retrieve the first key and access the installation image of the virtual storage appliance included in the archive image; and using the accessed installation image to install the virtual storage appliance on the host computer, the virtual storage appliance being installed in a manner establishing a post-installation operating state exclusive of the pre-installation operating state and in which the stable system value is no longer obtainable from the execution environment of the host computer.

3. The method of claim 1, wherein the virtual storage appliance is implemented using a software image also usable to realize a dedicated hardware storage appliance, and uses underlying raw storage resources to present value-added storage to applications executing in a computer system including the host computer.

4. The method of claim 3, wherein the value-added services include one or more of RAID, data deduplication, compression, and clustering and failover, and wherein the virtual storage appliance is a consumer of lower-level storage resources including plain virtual disks, and a provider of higher-level storage resources to the applications.

5. The method of claim 1, wherein the stable system value relates to a partitioning of a system device on which the archive image and installation image are stored, and further including, in connection with using the accessed installation image to install the virtual storage appliance, modifying the partitioning of the system device to thereby make the stable system value unavailable in the post-installation operating state.

6. The method of claim 5, wherein the partitioning of the system device in the post-installation operating state includes cores and swap partitions not present in the pre-installation operating state.

7. The method of claim 5, wherein the archive image is written to a root runtime device provided to the virtual storage appliance by a virtualizer during creation of a virtual machine for the virtual storage appliance, and the archive image includes a self-installer that, on first boot, performs an installation of the installation image to a backend mirror device partitioned from storage provided by the virtualizer to the virtual storage appliance, and thereafter repartitions the root runtime device and images it from the backend mirror device to yield the installed installation image.

8. The method of claim 1, wherein the lockbox includes a second stable system value being a unique instance identifier that only the virtual storage appliance matches, uniquely keying the installation image to the virtual storage appliance.

9. The non-transitory computer-readable medium of claim 2, wherein the virtual storage appliance is implemented using a software image also usable to realize a dedicated hardware storage appliance, and uses underlying raw storage resources to present value-added storage to applications executing in a computer system including the host computer.

10. The non-transitory computer-readable medium of claim 9, wherein the value-added services include one or more of RAID, data deduplication, compression, and clustering and failover, and wherein the virtual storage appliance is a consumer of lower-level storage resources including plain virtual disks, and a provider of higher-level storage resources to the applications.

11. The non-transitory computer-readable medium of claim 2, wherein the stable system value relates to a partitioning of a system device on which the archive image and installation image are stored, and wherein the method further includes, in connection with using the accessed installation image to install the virtual storage appliance, modifying the partitioning of the system device to thereby make the stable system value unavailable in the post-installation operating state.

12. The non-transitory computer-readable medium of claim 11, wherein the partitioning of the system device in the post-installation operating state includes cores and swap partitions not present in the pre-installation operating state.

13. The non-transitory computer-readable medium of claim 11, wherein the archive image is written to a root runtime device provided to the virtual storage appliance by a virtualizer during creation of a virtual machine for the virtual storage appliance, and the archive image includes a self-installer that, on first boot, performs an installation of the installation image to a backend mirror device partitioned from storage provided by the virtualizer to the virtual storage appliance, and thereafter repartitions the root runtime device and images it from the backend mirror device to yield the installed installation image.

14. The non-transitory computer-readable medium of claim 2, wherein the lockbox includes a second stable system value being a unique instance identifier that only the virtual storage appliance matches, uniquely keying the installation image to the virtual storage appliance.

15. A computer, comprising:
processing circuitry; and
memory storing computer program instructions executed by the processing circuitry to cause the computer to perform a method of securing an installation image of a virtual storage appliance to be installed on the computer, the method including:
  initiating installation of the virtual storage appliance from an archive image stored on the computer and establishing a pre-installation operating state, the archive image including the installation image with a lockbox storing a first key for accessing the installation image, the lockbox being encrypted using a second key derived from a stable system value obtainable from an execution environment of the computer in the pre-installation operating state;
  obtaining the stable system value from the execution environment and using it in decrypting the lockbox to retrieve the first key and access the installation image of the virtual storage appliance included in the archive image; and
  using the accessed installation image to install the virtual storage appliance on the computer, the virtual storage appliance being installed in a manner establishing a post-installation operating state exclusive of the pre-installation operating state and in which the stable system value is no longer obtainable from the execution environment of the computer.

16. The computer of claim 15, wherein the virtual storage appliance is implemented using a software image also usable to realize a dedicated hardware storage appliance, and uses underlying raw storage resources to present value-added storage to applications executing in a computer system including the host computer.

17. The computer of claim 16, wherein the value-added services include one or more of RAID, data deduplication, compression, and clustering and failover, and wherein the virtual storage appliance is a consumer of lower-level storage resources including plain virtual disks, and a provider of higher-level storage resources to the applications.

18. The computer of claim 15, wherein the stable system value relates to a partitioning of a system device on which the archive image and installation image are stored, and wherein the method further includes, in connection with using the accessed installation image to install the virtual storage appliance, modifying the partitioning of the system device to thereby make the stable system value unavailable in the post-installation operating state.

19. The computer of claim 18, wherein the partitioning of the system device in the post-installation operating state includes cores and swap partitions not present in the pre-installation operating state.

20. The computer of claim 18, wherein the archive image is written to a root runtime device provided to the virtual storage appliance by a virtualizer during creation of a virtual machine for the virtual storage appliance, and the archive image includes a self-installer that, on first boot, performs an installation of the installation image to a backend mirror device partitioned from storage provided by the virtualizer to the virtual storage appliance, and thereafter repartitions the root runtime device and images it from the backend mirror device to yield the installed installation image.

\* \* \* \* \*